United States Patent
Dietrich

(10) Patent No.: US 6,325,572 B1
(45) Date of Patent: Dec. 4, 2001

(54) PROCESS AND DEVICE FOR PNEUMATICALLY CONVEYING POWDERY SUBSTANCES AND THEIR USE

(76) Inventor: Frederic Dietrich, 44 chemin de la Maison Jean, CH-1801 Le Mont-Pelerin (CH)

( * ) Notice: Subject to any disclaimer, the term of this patent is extended or adjusted under 35 U.S.C. 154(b) by 0 days.

(21) Appl. No.: 09/284,822
(22) PCT Filed: Oct. 21, 1997
(86) PCT No.: PCT/EP97/05802
 § 371 Date: Jul. 12, 1999
 § 102(e) Date: Jul. 12, 1999
(87) PCT Pub. No.: WO98/17558
 PCT Pub. Date: Apr. 30, 1998

(30) Foreign Application Priority Data

Oct. 22, 1996 (DE) ............................. 196 43 523
Oct. 28, 1996 (DE) ............................. 196 54 649

(51) Int. Cl.[7] .................................................. B65G 53/60
(52) U.S. Cl. .......................... 406/171; 406/146; 406/172; 406/168; 406/167
(58) Field of Search .................... 406/146, 171, 406/172, 173, 167, 168

(56) References Cited

U.S. PATENT DOCUMENTS

| 3,232,494 | * | 2/1966 | Poarch. | |
|---|---|---|---|---|
| 3,236,565 | * | 2/1966 | Kester et al. . | |
| 3,635,377 | * | 1/1972 | Potvin | 222/145.7 |
| 3,737,074 | * | 6/1973 | Davies | 406/171 |
| 3,769,874 | * | 11/1973 | Williams et al. | 86/20.15 |
| 4,083,607 | * | 4/1978 | Mott | 406/17 F |
| 4,290,555 | * | 9/1981 | Suwa et al. | 239/8 |
| 4,415,297 | * | 11/1983 | Boring | 406/168 |
| 4,599,092 | * | 7/1986 | Eichelsbacher et al. | 48/197 R |
| 4,701,080 | * | 10/1987 | Aalst | 406/109 |
| 4,755,190 | * | 7/1988 | Harris | 422/213 |
| 5,033,914 | * | 7/1991 | Wuertele et al. | 406/109 |
| 6,077,920 | * | 6/2000 | Wang et al. | 526/88 |

FOREIGN PATENT DOCUMENTS

2492347 * 10/1980 (FR) .

* cited by examiner

Primary Examiner—Christopher P. Ellis
Assistant Examiner—Richard Ridley
(74) Attorney, Agent, or Firm—Bachman & LaPointe, P.C.

(57) ABSTRACT

A device for the pneumatic conveyance of particulate substance having a specific gravity of 0.1 to 15.0 g/cm$^2$ and a particle size of between 0.1 to 300 μm includes a flat plate like filter element between a pump chamber and sources of positive and negative pressure. The flat plate filter element provides a desired pressure drop and is cleaned of particulate material during operation of the device upon application of positive pressure.

23 Claims, 4 Drawing Sheets

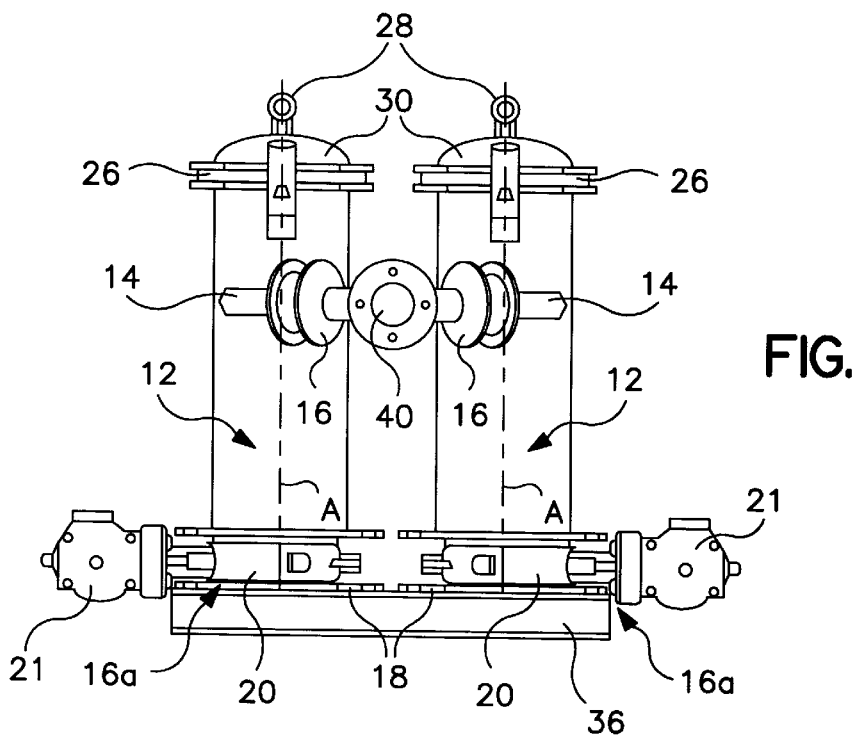
FIG. 6
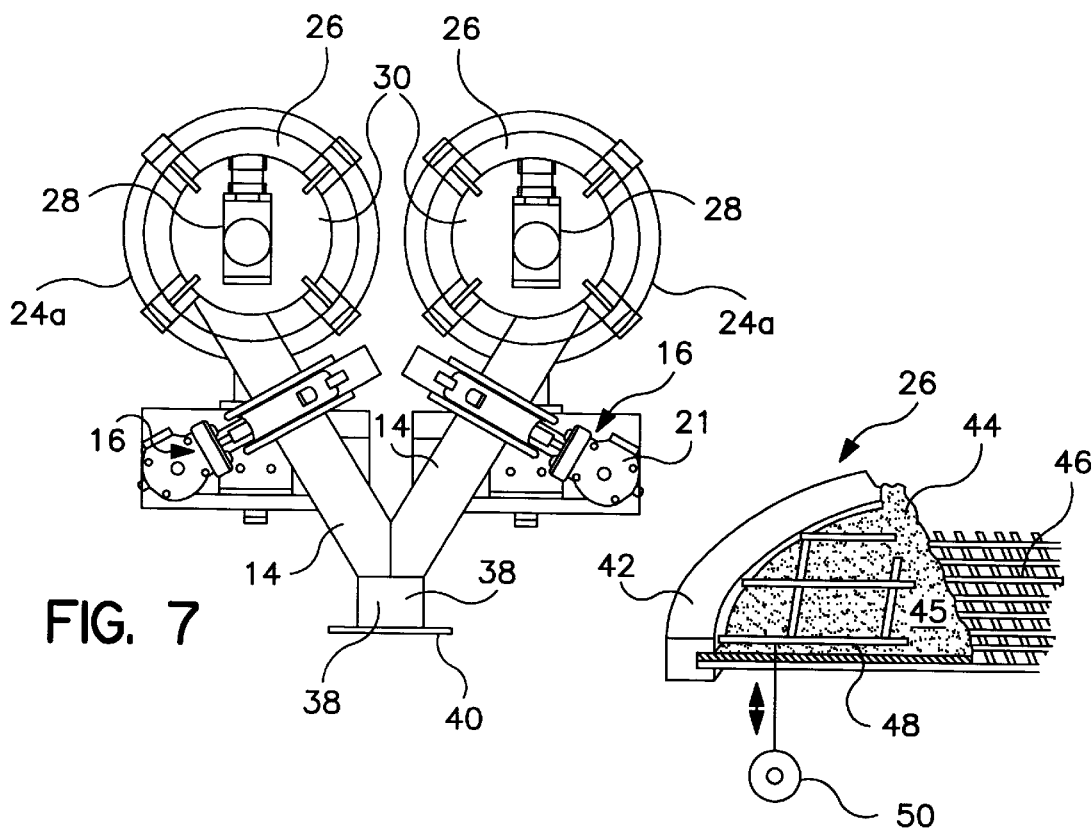
FIG. 7
FIG. 8

PROCESS AND DEVICE FOR PNEUMATICALLY CONVEYING POWDERY SUBSTANCES AND THEIR USE

BACKGROUND OF THE INVENTION

The invention concerns an apparatus and a process for pneumatically conveying powdery substances having a container using at least one filter in pipe systems. The invention also concerns the use of said apparatus and/or said process.

EP-A-0 574 596 describes an installation for pneumatically transshipping cement from ships into silos by means of a so-called lock container comprising a plurality of container segments; disposed in the uppermost container segment is an exhaust air filter while the lowermost container segment tapers in a funnel-like configuration.

The chemical. pharmaceutical and foodstuff industries also involve conveying powdery substances and transporting them in a controlled atmosphere. The known installations for conveying powdery substances of that kind are generally matched in regard to their structure to the product which is to be subsequently conveyed; those installations involve individual fabrications which give rise to high levels of installation costs. A further disadvantage with the known installations is inter alia that the required filters already clog up after a short period of operation. As a consequence of that problem, production of the powdery substances is frequently subjected to disturbances which result in production failures that have an adverse effect on costs. It has not been possible at the present time to overcome those deficiencies.

The operation of introducing powder into reaction vessels or reactors within explosive areas is generally effected manually by way of a lock arrangement or a protective valve as most reactors do not have the container comprising a plurality of container segments; disposed in the uppermost container segment is an exhaust air filter while the lowermost container segment tapers in a funnel-like configuration.

The chemical pharmaceutical and foodstuff industries also involve conveying powdery substances and transporting them in a controlled atmosphere. The known installations for conveying powdery substances of that kind are generally matched in regard to their structure to the product which is to be subsequently conveyed; those installations involve individual fabrications which give rise to high levels of installation costs. A further disadvantage with the known installations is inter alia that the required filters already clog up after a short period of operation. As a consequence of that problem. production of the powdery substances is frequently subjected to disturbances which result in production failures that have an adverse effect on costs. It has not been possible at the present time to overcome those deficiencies.

The operation of introducing powder into reaction vessels or reactors within explosive areas is generally effected manually by way of a lock arrangement or a protective valve as most reactors do not have the necessary space for an adequate loading installation. Such a mode of operation however does not comply with the applicable safety rules for obviating the risk of explosion: if the reactor is inerted, the step of manually introducing powders from the manhole results in atmospheric pressures and eliminates the protective effect of the inert gas. Upon manual introduction of solid material, the inerting effect is eliminated within a short period of time (O2 concentration >8%) and is not restored even after prolonged operational N2-flushing.

Furthermore the dust can result in contamination of the environment; the gas vapours which are developed give rise to the risk of asphyxiation for the operating personnel. The risks of explosion during the conveying procedure are possible in particular when the following factors come together at the same time:

oxidisable powder;

powder/oxygen ratio is within an explosion limit (varies according to the respect product involved); and formation of an ignition source (electrostatic discharge, flame, hot spot, sparks).

In consideration of those aspects the inventor set himself the aim of eliminating the acknowledged disadvantages and permitting inexpensive conveying of powdery substances, including sticky substances. In particular the invention seeks to provide that powdery solids can be introduced into reactors or the like units with an enhanced level of safety. 2 Amended Page That object is attained by the teaching set forth hereinbelow.

SUMMARY OF THE INVENTION

In accordance with the invention, in the above-mentioned apparatus for pneumatically conveying powdery substances of a specific weight of 0.1 to 15 $g/cm^3$ and with a grain size range of between 0.1 and 300 $\mu$m as the conveyed material, the ratio of the length of the container forming a pump chamber for temporarily receiving the conveyed material, to its internal diameter, is between 0.5 and 10.0 and the plate-like filter element is provided between a vacuum conduit of a vacuum pump for sucking in the conveyed material and the pump chamber, wherein a conveyor gas conduit of a conveyor gas source is connected to the space—in a dome cover—which is connected to the vacuum pump, and a respective automatic closure member is arranged both in the vacuum conduit and also in the conveyor gas conduit.

In addition, for handling of the filter, it has been found desirable for it to be in the form of a plate-like filter membrane which is preferably interchangeably disposed in a frame of a filter insert.

Advantageously, associated with the container according to the invention are four automatic blocking or closure elements which are controllable with each other, more specifically a respective one at each of the feed conduit and the discharge conduit and at the conduits for vacuum and conveying medium.

During a suction intake phase the closure element of the feed conduit opens whereas the discharge conduit remains closed. By virtue of the vacuum connection which is open in that situation, material to be conveyed is sucked into the pump chamber; after a predetermined period of time the feed conduit closes and the discharge is opened. The conveyed material is ejected by pressure—compressed air or nitrogen for filter cleaning purposes. The filter in the upper part of the container retains the finest particles and is cleaned in each emptying cycle.

Before the powder is introduced into the downstream-disposed reactor—for example a mixer, a crusher or the like unit in which a reaction takes place—air and powder are separated from each other by closure of the vacuum shut-off valve being delayed with respect to opening of the conveyed material intake. So that no gases of the reactor are sucked in when the discharge conduit is opened, the reactor is firstly put under pressure and only then is the emptying valve opened. Moreover the vacuum conduit can only be opened when the discharge conduit is closed.

A ratio of container length to container diameter in the range of between 0.5 and 10.0. preferably between 2.0 and 8.0. has been found desirable. The container width or the container diameter itself is advantageously between 10 and 500 mm, in particular between 50 and 400 mm, while the container length is between 200 and 1000 mm, in particular between 400 and 900 mm. This therefore involves a comparatively narrow container. wherein preferably the diameter of the container determines the size of the filter.

It is in accordance with the invention for the apparatus to be operated with a reduced pressure for sucking in the conveyed material of between 1 and 25 mbar, in particular between 5.0 and 20 mbar. The increased pressure for discharge of the conveyed material should for that purpose be between 0.5 and 5.0 bar. in particular between 1.0 and 3.0 bar.

In accordance with a further feature of the invention the filter is to be designed in such a way that a differential pressure of between 100 and 300 mbar occurs at its side remote from the vacuum pump.

It is also advantageous to provide a flat grid or mesh which at the vacuum side is associated with the filter as a support means. The preferred mesh size thereof is to be between 5 and 50 mm, preferably between 10 and 40 mm. A grid or mesh can also be provided at the other filter surface.

In addition., each grid or mesh can be connected to a vibratory drive and can thus be in the form of a vibration source for the filter.

In accordance with the invention, for the purposes of cleaning, associated with the filter during the emptying procedure is a counter-flow flushing operation which is controllable at periods of time, such an air jet can be provided at both filter surfaces.

Unlike the previous apparatuses and installations, smaller dimensions are possible while complying with the prerequisites in accordance with the invention, so that there are no space problems which have an adverse effect on the cost aspect.

A factor of particular significance is the possibility of using a plurality of these apparatuses jointly, for example in the form of a tandem installation, without any difficulties, for the purposes of increasing the through-put rate. Thus for example a plurality of the apparatuses are operated in juxtaposed relationship at the same rhythm or in an alternate rhythm.

It is also in accordance with the invention however, for the purposes of modifying the mixing ratio of the powdery substances, for at least two apparatuses to be operated side-by-side at different rhythms.

Preferably, cleaned compressed air, a reactive gas or an inert gas, in particular nitrogen, is used for discharge of the powdery substances by a pneumatic conveying action.

The described system permits the conveying of powdery products by way of a flat filter membrane which is installed in the upper part of a pump chamber; the diameter thereof substantially corresponds to that of the filter membrane.

Powdery products are conveyed by a vacuum and a pressure source being applied alternately to the pump chamber. The vacuum generated by a vacuum pump sucks the powder conveyed material into the pump chamber, and the filter separates particles sucked in by the vacuum pump from the air. The pressure of the conveying gas makes it possible to empty the pump chamber and at the same time to clean the filter by a counter-flow.

By virtue of those measures most problems in connection with transportation and metering of fine, sticky, contaminated powders can be resolved.

The following properties are to be viewed as particular advantages:

a mobile and compact system;

a simple structure with a cylindrical chamber. for many materials (SS, Haselloy, plastic material. glass);

a very simple cleaning operation;

an economical installation;

no damage to the powder during the conveying operation;

no clinging or adhesion of sticky powders with poor flow properties;

a completely closed-off system; no dust formation;

no oxygen feed possible in closed containers.

In addition the system considerably reduces the risk of explosion during the introduction of powders into reactors or similar vessels which contain combustible gases/vapors. As the powder conveying effect is achieved by suction, the risk of explosion in the conveyor conduit is considerably reduced. The powder/oxygen ratio is outside the explosion limit in most cases. As there are no rotatable parts, any kind of ignition or risk of explosion due to friction is also out of the question.

This procedure makes it possible for powders from sacks, big bags or silos to be introduced into a container which is under pressure, and it thus fully complies with the expectations in regard to the safety precautions in the chemical and pharmaceutical industries. There is the possibility of using various gases for emptying the pump chamber, for example nitrogen or argon. The use of a neutral gas for the emptying operation makes it possible for example to fill inerted reactors with powder, without introducing oxygen into the reactor. As a result the consumption of inert gas is low as it is not used during the suction intake phase for the powder conveying operation, but only for the step of emptying the pump chamber. In the pump chamber, the oxygen is separated from the powder and replaced by inert gas.

In systems which are available on the market, large filtering sleeves are required in order to prevent the filters from becoming excessively quickly gummed up; cleaning of a sleeve-type filter is difficult and not very efficient. In contrast, cleaning a flat filter is a simpler operation. Cyclic cleaning of the filter at frequent time intervals, in accordance with the invention, makes it possible to guarantee a constant level of filtration efficiency.

The volume of the chamber of hitherto conventional systems is large because of the large filter volume. Emptying of such installations is implemented by a gravimetric procedure. A reducing portion is normally necessary to permit the installation to be connected to a flange of standard size. The reduction frequently triggers off operational problems and requires the use of a vibrator or the like ancillary device for discharging the powder from the separator.

The use of the described apparatus and process is preferably implemented for acting on a reaction vessel in the chemical industry or the foodstuffs industry. in the pharmaceutical industry or in the industry producing inks and paints or lacquers.

BRIEF DESCRIPTION OF THE DRAWINGS

Further advantages, features and details of the invention will be apparent from the following description of preferred embodiments and with reference to diagrammatic views in the drawing in which:

FIG. 6 shows a side view of a twin assembly, FIG. 7 shows a plan view of the apparatus of FIG. 4, FIG. 8 is a perspective view of part of a filter insert.

DETAILED DESCRIPTION

Figure 5:
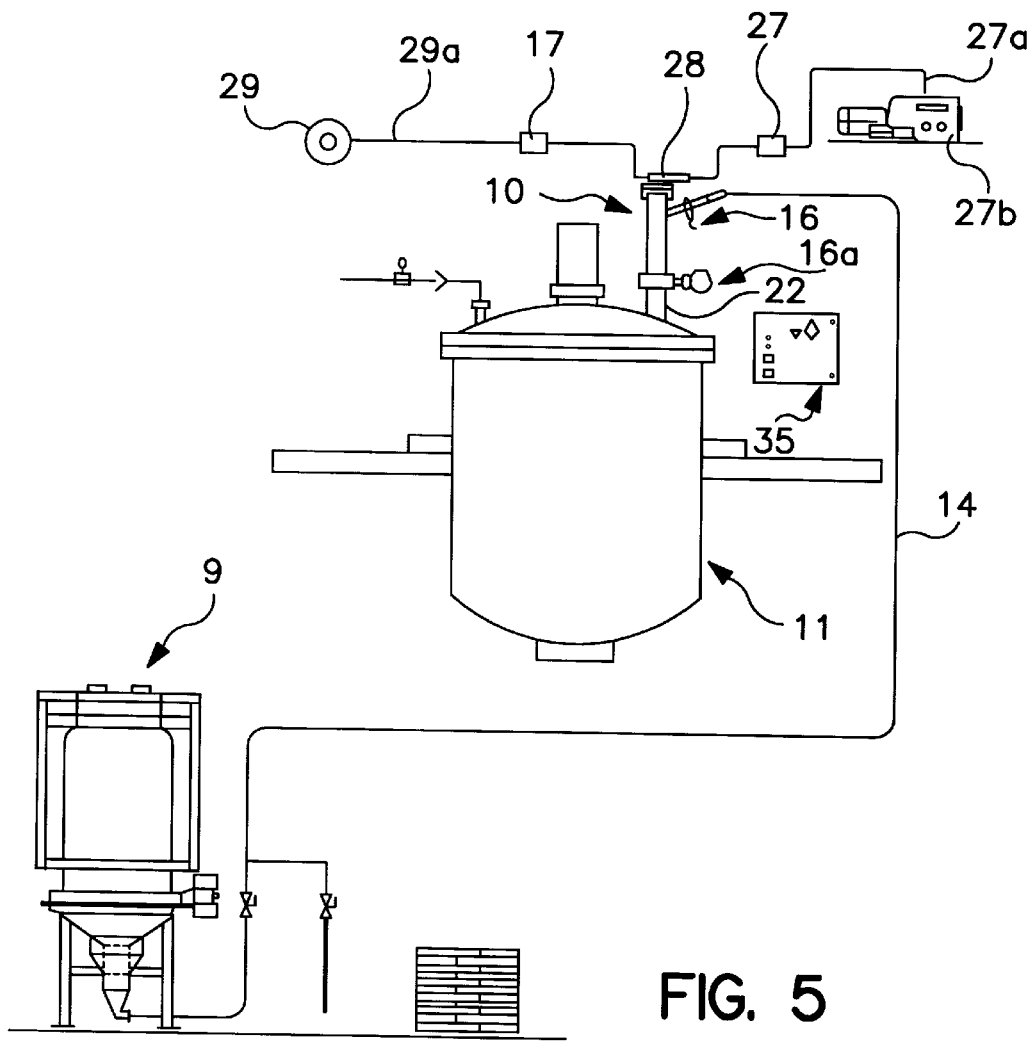
FIG. 5 shows the apparatus in an indicated installation.
Figure 3:
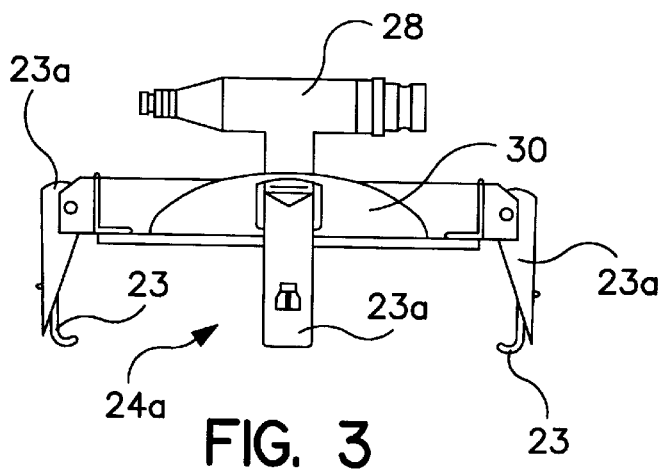
FIG. 3 is a side view of a clamping closure of the apparatus.
Figure 4:
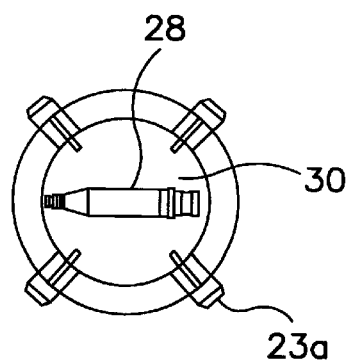
FIG. 4 is a plan view of the apparatus.

An apparatus 10 for pneumatically conveying powdery substances of a specific weight of 0.1 to 15.0 g/cm$^3$, in a grain size range of between 0.1 and 300 μm from a silo 9 indicated in FIG. 5 to a reaction vessel or reactor 11 has a cylindrical container 12—of electrolytically polished high-quality steel—of a length a of here 600 or 500 mm, the internal space of which, of an internal diameter d of 200 or 300 mm respectively, serves as a pump chamber 13, and a coupling adapter connection 14$_a$ for a feed conduit 14 for suction intake of the conveyed material. The feed conduit 14 includes a so-called butterfly valve 16 as a locking or closure member in a connecting flange 15.

Figure 9:
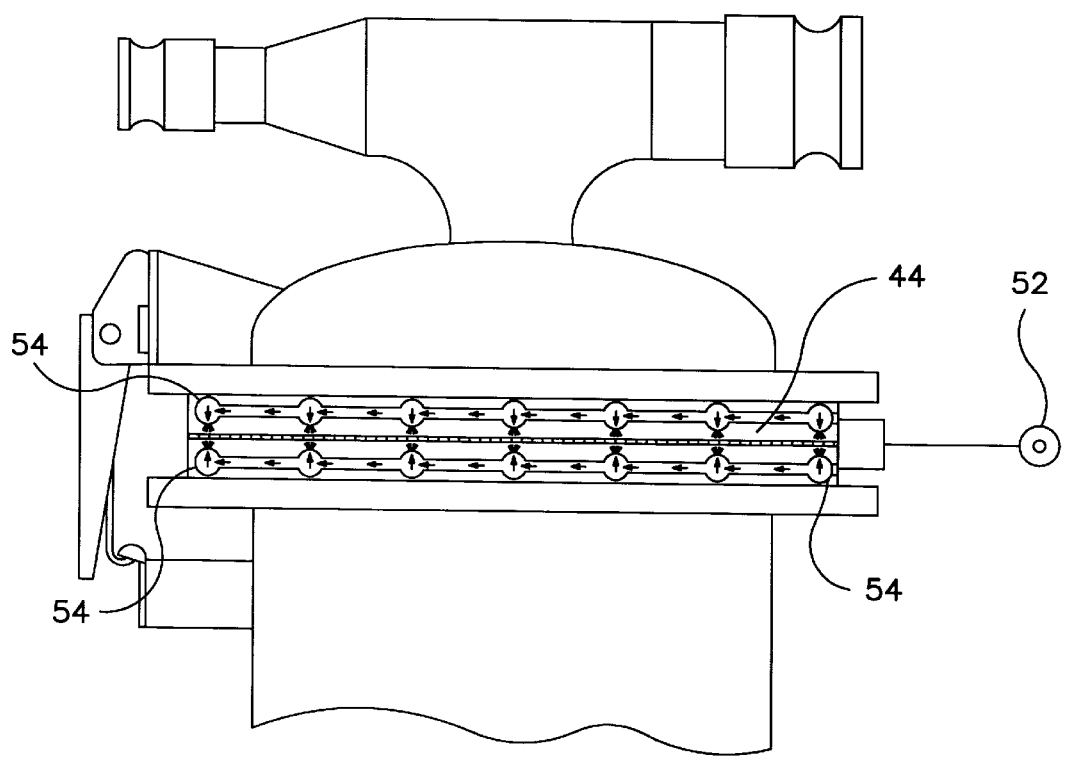
FIG. 9 is a partial sectional view of an air jet for clamping the filter.

As shown in FIG. 8, in an annular frame 42 of the filter insert 26, a filter or a filter membrane 44 is associated with a flat grid mesh 46 associated at the vacuum side, as a support element, the grid mesh 46 being of small mesh size. It can be connected to a vibratory drive 50 and transmit the vibrations thereof to the filter membrane 44. The latter is cleaned, see FIG. 9, by an air jet 52—controlled at intervals of time—; it is also possible to involve a plurality of such air jets 54 which are directed on to both surfaces of the filter membrane 44. A wide-mesh bar grid or lattice 48 can additionally support the filter membrane at the surface 45 which is remote from the grid mesh 46.

Figure 1:
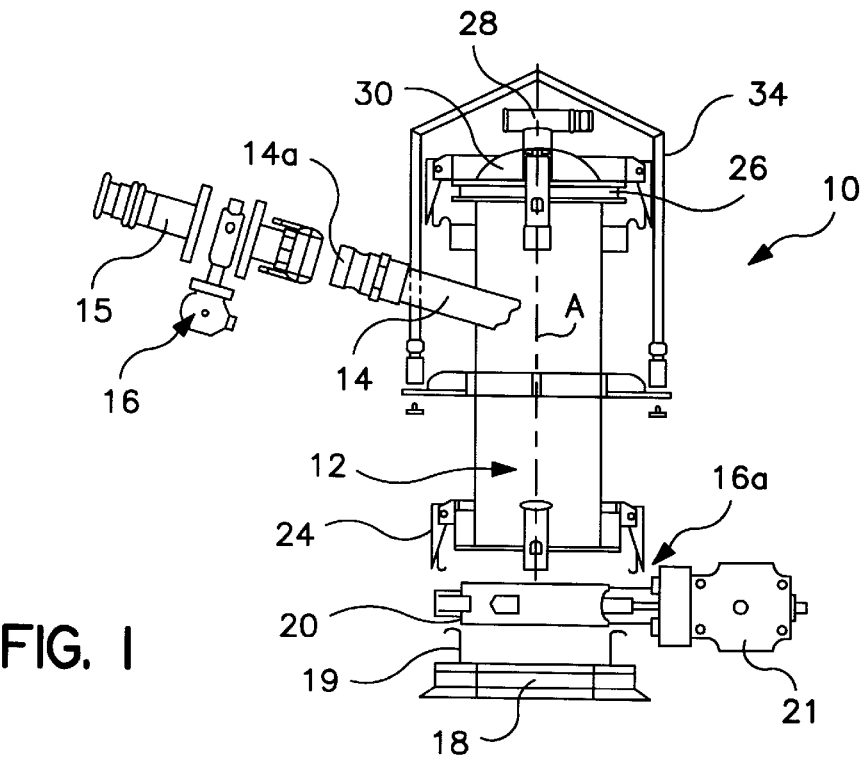
FIG. 1 is a side view of an apparatus for pneumatically conveying powdery substances.

In an upward direction. the container 12 terminates at a filter hinsert 26 which is spanned over by a dome cover 30 which is provided axially with a T-shaped connecting pipe 28. The cover 30 is fixed by a further locking device 24a to tie hooks 32 of the container 12. The upper part thereof is surrounded in FIG. 1—together with the described container cover arrangement 26. 30—by a hood structure 34.

Figure 2:
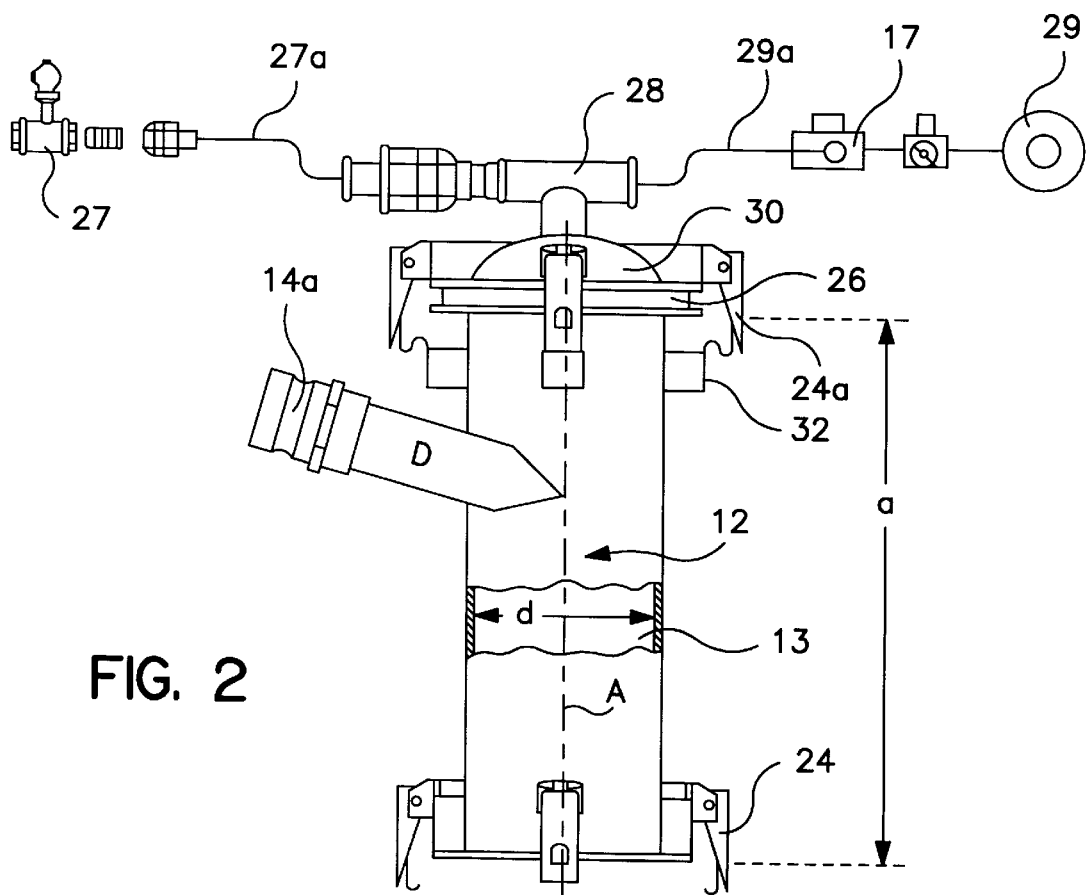
FIG. 2 is a detail from FIG. 1 on an enlarged scale.

Extending away from the connecting pipe 28 in FIG. 2 are on the one hand a vacuum conduit 27a with a vacuum valve 27 for a vacuum pump 27b which is arranged upstream of the latter, and on the other hand, a conveyor gas conduit 29a for a conveyor gas source 29. the conduit 29a including a closure valve 17.

During a suction intake phase the butterfly valve 16 of the feed conduit 14 is opened and the discharge conduit 22 remains closed. The pump chamber 13 now fills by virtue of a vacuum being built up by way of the vacuum conduit 27a up to a desired filling level, possibly also entirely.

After a predetermined period of time the feed conduit 14 is closed and the discharge conduit 22 is opened. The powder is ejected by means of pressure—for example of nitrogen for filter cleaning purposes—after opening of the closure valve 17, into the conveying gas conduit 29a. At the end of the suction intake phase the vacuum conduit 27a remains open for a given period of time before the butterfly valve 16a of the discharge conduit 22 is opened in order to remove the oxygen from the pump chamber 13.

A point of particular significance in this procedure is the filter in the filter insert 26, which retains the powder and at the same time maintains the suction capacity of the system. By virtue of its position between the pump chamber 13 and the conveying gas source 29 the filter is cleaned in each cycle and therefore retains its full filtration capacity.

The four closure elements 16. 16a, 17, 27 are connected together in terms of control procedure to a control box 35. During a suction intake phase the butterfly valve 16 of the feed conduit 14 opens whereas the discharge conduit 22 remains closed. By virtue of the vacuum valve 16 which is open in that situation. the pump chamber 13 is sucked full; after a predetermined period of time the feed conduit 14 closes and the discharge conduit 22 is opened. The conveyed material is ejected by pressure—compressed air or nitrogen for filter cleaning purposes. The filter in the upper part of the container 12 retains the finest particles and is cleaned in each emptying cycle.

Before the powder is introduced into the downstream-disposed reactor 11 air and powder are separated from each other by closure of the vacuum shut-off valve 16 being delayed with respect to opening of the conveyed material intake 14. So that no gases of the reactor 11 are sucked in when the discharge conduit 22 is opened, the container 12 is firstly put under pressure and it is only then that the emptying valve 16a is opened. Moreover the vacuum conduit 27a can only be opened when the discharge conduit 22 is closed.

A preferred suction intake phase is one of between 10 and 12 seconds and the emptying time will be of the order of magnitude of between 3 and 5 seconds; in order to avoid an over-pressure in the change in cycle, there is provided a pneumatically regulated throttle means. A second is normally sufficient for that delay procedure.

In the same manner, by virtue of the time delay effects in the control procedure, closure of the vacuum for evacuation of the air and opening of the butterfly valve 16a for powder emptying can be mutually adapted. A delay of a maximum of one second should also suffice here.

The emptying pressure—compressed air or nitrogen—is so regulated that the total amount of powder sucked in is ejected, without unnecessary dust formation. upon opening of the pump chamber 13 (ideal pressure =1.5 to 2 bars).

When dealing with very sticky products the pressure can be increased to between 2.5 and 3 bars in order to provide for complete emptying and thorough filter cleaning.

By way of example, the following operating states can occur for opened valves:

TABLE 1

| | | Feed | Discharge | Pressure gas | Vacuum |
|---|---|---|---|---|---|
| Valve | | 16 | 16a | 17 | 27 |
| Suction-intake phase | 1 | — | — | — | 1–2 sec * |
| | 2 | 3–20 sec * | — | — | 3–20 sec * |
| Intermediate phase | 3 | — | — | — | 1–2 sec * |
| | 4 | — | — | 1–2 sec * | — |
| Discharge phase | 5 | — | 5–10 sec * | 5–10 sec * | — |
| | 6 | — | — | — | — |

* Opening duration in sec.

In FIG. 6, two of the apparatuses 10 are mounted in parallel side-by-side relationship on carriers 36; their feed conduits 14 open into a common manifold or port pipe 38 with connecting flange 40 for a continuing conveyor conduit which is not shown in the drawing. If the two apparatuses 10 are caused to operate alternately in the described manner, it is possible to make a transition from a sequential system to a continuous system.

As shown in FIG. 8, in an annular frame 42 of the filter insert 26, a filter or a filter membrane 44 is associated with a flat grid mesh 46 associated at the vacuum side, as a support element, the grid mesh 46 being of small mesh size. It can be connected to a vibratory drive (not shown) and transmit the vibrations thereof to the filter membrane 44. The latter is cleaned by an air jet—controlled at intervals of time—; it is also possible to involve a plurality of such air jets which are directed on to both surfaces of the filter membrane 44. A wide-mesh bar grid or lattice 48 can additionally support the filter membrane at the surface 45 which is remote from the grid mesh 46.

The ratio of the length a to the diameter d of the container 12 is between 0.5 and 10, preferably between 2 and 8; with those structural factors, with a pressure of between 1 and 25 mbar—preferably between 5 and 20 mbar—on the suction intake side and a pressure of between 0.5 and 5 bars—preferably between 1 and 3 bars—for ejection of the powdery substance, it is possible readily to convey large amounts up to several tonnes per hour.

In order to prevent discharge sparks, all system parts such as hoses, valves and the like are conducting and must be grounded.

As investigations have shown, it is also possible to provide a metering action with a good degree of accuracy of <10%, with the described pump system or conveyor.

Preferred dimensions of the container 12, with predetermined operating parameters, are to be found in the Table hereinafter:

TABLE 2

| Diameter d container (mm) | Length a container (mm) | Throughput | | Vacuum (Nm3/h) | Suction pressure (mbar) |
| --- | --- | --- | --- | --- | --- |
| | | Pump (t/h) | Double pump (t/h) | | |
| 300 | 850 | 5 | 8 | 300 | 5–20 |
| 200 | 800 | 3 | 5 | 200 | 5–20 |
| 150 | 750 | 2 | 3 | 160 | 5–20 |
| 100 | 650 | 1 | 1.7 | 100 | 5–20 |
| 50 | 400 | 0.3 | 0.5 | 40 | 5–20 |

As the described principle is implemented for loading powders into the reactor 11 under inert gas protection, it is sufficient to replace the air for filter cleaning by inert gas. The internal oxygen content thus remains constant—or even decreases during the conveying period—and the level of N2-consumption remains low.

The powders can be very rapidly changed over, even while observing the strictest relevant standards. The suction intake bodies can comprise various materials such as high-quality steel, plastic material, Hastelloy or the like in order to comply with the most important limitations in the chemical sector.

The installation can also be connected to weighing systems so that the powders can be accurately metered directly into the reactors 11.

What is claimed is:

1. A device for the pneumatic conveyance of a pulverulent substance having a specific gravity of 0.1 to 15.0 g/cm$^3$ and a particle size of between 0.1 to 300 μm comprising a container having an inner diameter (d) and a length (a) wherein the ratio between (a) and (d) is between 0.5 to 10.0, the container defines a pump chamber, the pump chamber having a pulverulent substance supply line and a pulverulent substance discharge line, a source of negative pressure connected to the pump chamber via a vacuum line for drawing into the pump chamber via the supply line the material to be conveyed, a source of conveying gas connected to the pump chamber via a conveying gas line for discharging from the pump chamber via the discharge line the material to be conveyed, shut-off members in the vacuum line and the conveying gas line, a flat filter element disposed on the container between both the source of the negative pressure and the source of conveying gas and the pump chamber and has a diameter which is ≦d, and means for vibrating the filter element.

2. A device according to claim 1 wherein a support having a frame defining a space for receiving the flat filter element is support on the container.

3. A device according to claim 1 wherein the diameter of the filter element corresponds approximately to the diameter (d) of the container and the container diameter (d) is substantially consistent and is between 10 and 500 mm.

4. A device according to claim 1 wherein the container is provided both at its supply line and at its discharge line with respective automatic shut-off members wherein a common control element is associated with the respective automatic shut-off members.

5. A device according to claim 1 wherein the length (a) of the container is between 200 and 1000 mm and the ratio between the length (a) of the container to its diameter (d) is between 2.0 and 8.0.

6. A device according to claim 1 wherein the length (a) of the container is between 400 and 900 mm and the ratio between the length (a) of the container to its diameter (d) is between 2.0 and 8.0.

7. A device according to claim 1 wherein the source of negative pressure is between 1 and 25 mbar for drawing in the material to be conveyed and the conveying gas pressure is between 0.5 and 5.0 bar for discharging the material to be conveyed.

8. A device according to claim 1 wherein the source of negative pressure is between 1 and 25 mbar for drawing in the material to be conveyed and the conveying gas pressure is between 2.0 and 3.0 bar for discharging the material to be conveyed.

9. A device according to claim 1 wherein the filter element provides a differential pressure of between 100 and 300 mbar.

10. A device according to claim 2 wherein the support comprises a plane lattice having a mesh width of between 5 and 50 mm wherein the lattice is connected to a vibration drive.

11. A device according to claim 1 wherein the filter element is arranged in an air jet.

12. A device according to claim 2 wherein the filter element is covered on both sides by a lattice wherein one of the lattices is rigidly connected to the frame.

13. A device according to claim 1 wherein the device is connected to at least one further device to form a multiple installation, upstream of a reaction vessel.

14. A process for the pneumatic conveyance of pulverulent substances having a specific gravity of 0.1 to 15.0 g/cm$^3$ and a particle size range of between 0.1 and 300 μm comprising the steps of providing a device comprising a container having an inner diameter (d) and a length (a) wherein the ratio between (a) and (d) is between 0.5 to 10.0, the container defines a pump chamber, the pump chamber having a pulverulent substance supply line and a pulverulent substance discharge line, a source of negative pressure connected to the pump chamber via a vacuum line for drawing into the pump chamber via the supply line the material to be conveyed, a source of conveying gas connected to the pump chamber via a conveying gas line for discharging from the pump chamber via the discharge line the material to be conveyed, shut-off members in the vacuum line and the conveying gas line, a flat filter element disposed on the container between both the source of the negative pressure and the source of conveying gas and the pump chamber and has a diameter which is $\leq d$, and means for vibrating the filter element, carrying out an intake phase with the shut-off member of the vacuum line opened and at a negative pressure of between 1 and 25 mbar applied and with the discharge line closed and a shut-off member of the supply line open, closing the shut-off member of the supply line after an interval predetermining the level in the pump chamber, thereafter opening a shut-off member of the discharge line and a shut-off member of the conveying-gas line to form an emptying cycle during which the material to be conveyed is ejected by means of a pressure flow consisting of compressed gas wherein the filter element is vibrated and simultaneously purified.

15. A process according to claim 14 applying a negative pressure of 5.0 to 20 mbar during the intake phase.

16. A process according to claim 14 wherein the intake phase lasts 10 to 12 sec during which the vacuum line is kept open while the discharge line is still closed.

17. A process according to claim 14 including pressurizing the container before the discharge line is opened so as to prevent the ingress of gases from a downstream reactor.

18. A process according to claim 14 including providing an excess pressure of between 0.5 and 5.0 bar, in order to discharge the material to be conveyed.

19. A process according to claim 14 including providing a differential pressure of between 100 and 300 mbar on the side of the filter element remote from the vacuum.

20. A process according to claim 14 including supplying a gas selected from the group consisting of purified compressed air, an inert gas, a reactive gas for the pneumatic discharge of the pulverulent substances.

21. A process according to claim 14 including providing a plurality of devices and operating the device in series.

22. A process according to claim 14 including providing a plurality of devices and operating the device in parallel.

23. A process according to claim 14 including providing two devices and alternatively operating the systems.

* * * * *